Oct. 11, 1966  E. A. HULBERT  3,277,649
GAS TURBINE ENGINE WITH GOVERNOR DRIVE
FROM POWER TURBINE SHAFT
Filed May 28, 1964
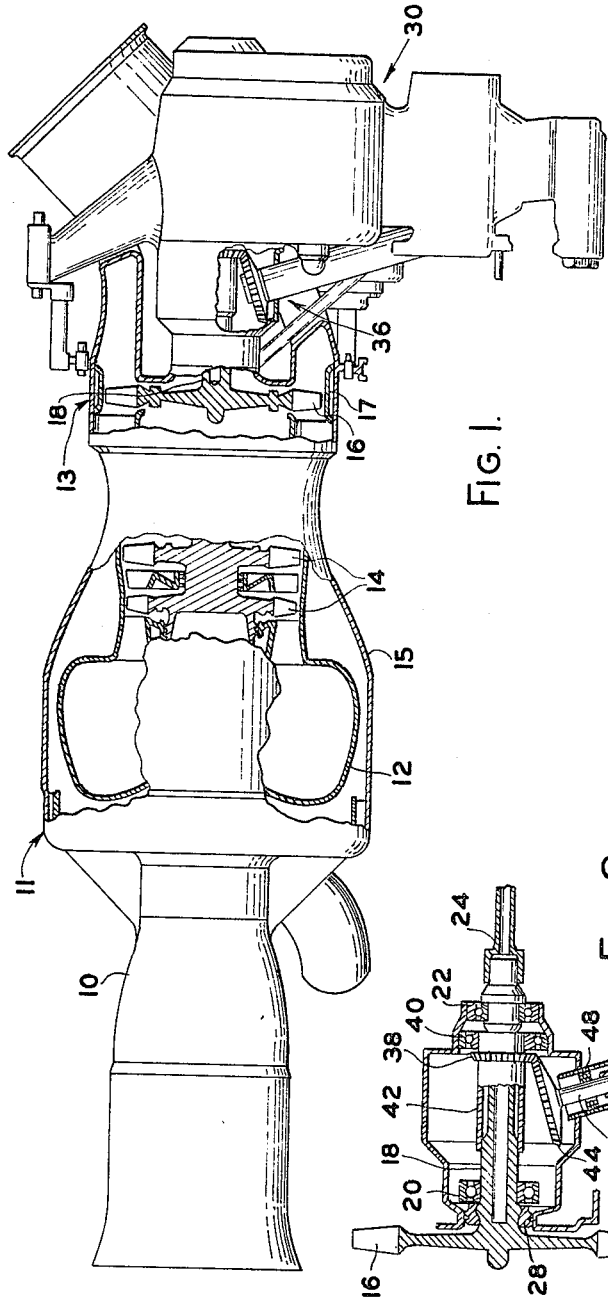
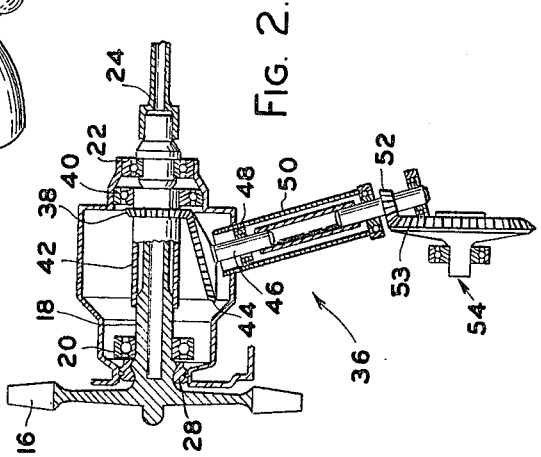
INVENTOR
EDWARD A. HULBERT
BY
*Hawker Hawke*
ATTORNEYS

United States Patent Office 3,277,649
Patented Oct. 11, 1966

3,277,649
GAS TURBINE ENGINE WITH GOVERNOR DRIVE FROM POWER TURBINE SHAFT
Edward A. Hulbert, Grosse Pointe, Mich., assignor to Continental Aviation and Engineering Corporation, Detroit, Mich., a corporation of Virginia
Filed May 28, 1964, Ser. No. 370,900
3 Claims. (Cl. 60—39.16)

This invention relates to turboshaft engines and more particularly relates to a governor drive for the power turbine in a free turbine engine.

The free turbine engine is characterized by two mechanically independent rotating systems. The first rotating system, called the gas generator or gasifier consists of a compressor and a turbine which furnishes the power to drive the compressor. The second rotating system consists of the power turbine, connecting shafting, a speed reduction gear, and the useful load. This second rotating system is actuated by the hot gas furnished by the first system and has no mechanical connection thereto. As a result, the free turbine engine includes an inherent hazard which is not present in any previous form of power plant. If a failure occurs in the drive train between the free turbine and the load, a sudden loss of load will result while the gas generator is still producing hot gas at the same energy level as before the failure. Since the load is then disconnected from the turbine, the full energy of the gas is absorbed only by the acceleration of the free turbine and the portion of the drive train still connected thereto. This acceleration is a maximum at the instant of load release and decreases to zero at the turbine speed where the turbine blade velocity is equal to the gas velocity. This final or equilibrium speed is far beyond the safe operating speed of any turbine designed with light weight as an objective.

In most free turbine engines, the turbine governor drive train originates at a point in the reduction gear train so as to minimize the speed reduction required to drive the governor. However, the result of an arrangement of this kind is that any failure between the turbine and output shaft of the reduction gear resulting in a loss of the load will render the governor inoperative to prevent overspeed, and will probably result in a turbine disc burst with destructive effects to the engine and surrounding objects.

In well designed and constructed light weight turbines, mechanical reliability of components should be such that many thousands of hours of field operation should be attained for each incident of mechanical failure, but this particular type of failure, a turbine disc burst, is so destructive that it should be avoided to a greater degree than may be possible by ordinary reliability improvement means.

It is therefore the principal object of the present invention to greatly reduce the probability of turbine burst in a free turbine engine. This object is preferable to other common solutions to the free turbine burst problem; that of providing containment barriers to catch the fragments of deliberately weakened blades, or that of providing sturdier barriers to contain the fragments of burst discs. Such solutions add needless weight and reduce the desirable stress margins.

It is an object of the present invention to prevent turbine burst by rendering it statistically improbable that excessive turbine overspeed will ever be experienced.

This object is preferable to that of minimizing damage resulting from excessive overspeed.

It is an object of the present invention to provide a power turbine governor and governor drive train which will substantially reduce the probability of turbine burst or excessive turbine speed without the addition of weight or equipment beyond that presently required for conventional governor drive means.

The present invention achieves this object by providing a governor drive which is mechanically independent of the power transmitting gear train. As a result of this construction of the governor drive train, it is statistically improbable that destructive turbine overspeed will ever occur. Such an occurrence would require the simultaneous failure of the main power train and either the power turbine governor or its own independent drive train.

If either the power turbine governor or its drive train fails, the governor will slow down and thereby cause the fuel control to deliver more fuel. The additional fuel will speed up the gas generator, the power turbine, and the output shaft. This should signal the pilot or operator of a malfunction in the engine and that the gas generator speed should be reduced by resetting the condition lever or the engine shut down. A fully alert operator should react to this situation in a few seconds. However, even if he should take two full minutes to react, and assuming that the reliability of the governor and its drive train is such that failures occur once each 100,000 hours of field operation, his two minutes reactance time represents only one three-millionth of the assumed time between failures. The only way in which destructive overspeed of the power turbine could occur would be as the result of a second failure in the main power train somewhere between the turbine and the useful load during the same two-minute reactance time of the operator. Assuming that the reliability of the main power train is the same as for the governor and its drive train, that is, one failure for each 100,000 hours of field operation, for this train to fail in any two minute period means that it will also fail in one three-millionth ($.333 \times 10^{-6}$) of the time between failures.

It can be seen that simultaneous failure of both trains within the same two-minute reactance period will occur only in the proportion of the total engine running time represented by the product of these two very small numbers. This product is $(.333 \times 10^{-6})^2$ which is the incredibly small number of $.111 \times 10^{-12}$. This means that about 300 billion field service engine running hours will elapse between each incident of uncontrolled overspeed of a power turbine. Even if the reliability of each train were only one thirty-third as high as assumed, that is one failure for each 3000 running hours, a completely unsatisfactory reliability, there would still be 275 million hours of field service operation between incidents of uncontrolled overspeed of a power turbine. This would be the equivalent to running 55,000 engines 1000 hours a year for 5 years between incidents of uncontrolled overspeed of the power turbine. It can be seen, therefore, that the fundamental principle of providing two independent systems will completely nullify the inherent hazard of turbine bursts in a free turbine engine.

Others objects and advantages of the present invention will be more readily apparent from the following detailed description of a preferred embodiment thereof. The description makes reference to the drawing in which FIG. 1 is a side view taken through an internal combustion turbine engine with various parts broken away and others shown in cross-section for purposes of clarity; and FIG. 2 is an enlarged fragmentary longitudinal cross-sectional view of the governor drive train in the engine of FIG. 1.

Referring to the drawings in detail FIG. 1 shows a turboshaft engine adapted to drive the rotors in a conventional helicopter aircraft. The engine includes a gasifier generally indicated at 11 and comprising a compressor section, generally indicated at 10, a combustor 12, and turbines 14. The compressor 10 directs compressed air into the toroidal-shaped annular combustor 12. The hot gas from the combustor drive the pair of axially mounted turbines 14. The entire engine is mounted in a conventional engine housing 15.

The engine further includes a power turbine section 13 comprising a power turbine 16 mounted rearwardly of the turbines 14 and the combustor 12 in an annular shroud 17 and fixed to a hollow drive shaft 18. The drive shaft, as shown in FIG. 2, is supported in a forward power turbine bearing 20 and an aft power turbine bearing 22. A quill drive shaft 24 is splined to the end of the shaft 18 and is supported on its own rearward bearing (not shown). An annular labyrinth seal 28 surrounds the shaft 18 adjacent the turbine 16. The quill drive shaft 24 is connected through a suitable reduction gear train in the rear section 30 of the engine to the helicopter rotors (not shown).

The governor drive, indicated generally at 36 and shown in detail in FIG. 2, is positioned between the forward and aft bearings 20 and 22. The drive includes a primary bevel gear 38 mounted in its own bearing 40 independent of the power turbine shaft bearings. The bevel gear 38 is connected to a hollow shaft 42 which is concentric to and splined to the drive shaft 18 immediately beyond the forward bearing 20. The inner diameter of the connecting shaft 42 is substantially larger than the outer diameter of the drive shaft 18. As a result, a considerable radial clearance is provided between these shafts 18 and 42.

An engaging bevel gear 44 mounted on a shaft 46 is rotated by the primary gear 38. The shaft 46 is supported in a bearing 48 and encased in a housing 50. The lower end of the shaft is connected by a second bevel gear arrangement 52, 53 to the power turbine governor at 54.

It can be seen that the embodiment of the invention shown in FIGS. 1 and 2 provides a maximum of independence between the governor drive and the power train. Loss of load at any point in the power train from the reduction gear to the helicopter rotor shaft will clearly not impair the operation of the governor. In fact, the isolation of the governor drive is so complete that it can be reasoned that only two possible failures could occur which could in any way jeopardize the governor drive and also result in loss of load.

The first of these possible failures is the failure of the aft power turbine bearing 22. In the event of such failure, the turbine will pivot around the forward bearing 20 and the turbine blades will scrape on the shroud 17 before damaging the governor drive. Even if this erratic motion should produce a broken drive shaft 18, the governor drive will remain intact due to the radial clearance between the shafts 18 and 42.

In the case of the other prime failure, that of the forward power turbine bearing 20, the turbine assembly will tilt about the aft bearing 22. In this event, the labyrinth seal 28 will function as a bearing while the turbine blades will scrape on the turbine shroud 17. The independent bearing 40 on the governor drive gear 38 should continue to adequately support the governor drive gear.

The effectiveness of the present independent governor drive can be greatly increased by employing a fast acting governor. Systems of this type which might be employed include direct acting power turbine governors, accelerometer type fuel cutoffs, and compound power turbine governors.

It will be apparent to those skilled in the art to which this invention pertains that various changes or modifications in the construction of the component parts may be made without departing from the spirit of the invention or from the scope of the appended claims.

I claim:
1. A free turbine engine assembly comprising
 (a) a gasifier,
 (b) a power turbine assembly including a power turbine driven by the products of combustion issuing from said gasifier and a shaft portion,
 (c) a power train including a power shaft and means drivingly connecting said power shaft to said power turbine shaft portion,
 (d) a governor assembly adapted to sense rotational speed of said power turbine,
 (e) said governor assembly including a governor drive and means independent of said means drivingly connecting said power shaft to said power turbine shaft portion to drivingly connect said governor drive to said power turbine shaft portion,
 (f) said last mentioned connecting means comprising a hollow shaft concentric to and splined to said power turbine shaft portion and engaging gear means carried by said hollow shaft and said governor drive,
 (g) axially spaced bearing means rotatably supporting said power turbine shaft in fixed structure, and
 (h) bearing means spaced intermediate said first mentioned bearing means and rotatably supporting said hollow shaft in fixed structure.

2. The turbine assembly as defined in claim 1 and in which
 (a) a portion only of the axial length of said hollow shaft being splined to said power turbine shaft,
 (b) said intermediate spaced bearing means rotatably supporting the unsplined portion of said hollow shaft, said bearing member encompassing said unsplined portion of said hollow shaft.

3. A free turbine engine assembly comprising
 (a) a gasifier,
 (b) a power turbine assembly including a power turbine driven by the products of combustion issuing from said gasifier and a shaft portion,
 (c) means rotatably supporting said power turbine assembly and including a first bearing member supporting said shaft portion in fixed structure adjacent said power turbine and a second bearing member supporting said shaft portion in fixed structure at point axially spaced from said first bearing member,
 (d) a power train including a power shaft and means drivingly connecting said power shaft to said power turbine shaft portion outside of said bearing members,
 (e) a governor assembly adapted to sense rotational speed of said power turbine and regulate fuel delivery to said gasifier in response to changes in the rotational speed of said power turbine,
 (f) said governor assembly including a governor drive and means drivingly connecting said governor drive to said power turbine shaft,
 (g) said last mentioned means comprising a hollow shaft concentric to and splined to said power turbine shaft portion intermediate said first and second bearing members and engaging gear means carried by said hollow shaft and said governor drive,
 (h) said hollow shaft having an unsplined portion radially outwardly spaced from said power turbine shaft portion and a bearing means positioned intermediate said first and second bearing members and supporting said unsplined portion in fixed structure.

References Cited by the Examiner
UNITED STATES PATENTS

| | | |
|---|---|---|
| 2,426,878 | 9/1947 | Willgoos. |
| 2,643,512 | 6/1953 | Stalker _____ 60—39.16 |
| 2,968,922 | 1/1961 | Gilbert _____ 60—39.16 X |
| 2,971,334 | 2/1961 | Carlson _____ 60—39.16 |
| 3,040,529 | 6/1962 | Hurtle _____ 60—39.16 |

JULIUS E. WEST, *Primary Examiner.*

MARK NEWMAN, *Examiner.*